US006712390B1

(12) United States Patent
Spinelli

(10) Patent No.: US 6,712,390 B1
(45) Date of Patent: Mar. 30, 2004

(54) VEHICULAR IMPACT RESISTANT BARRIER SYSTEM

(76) Inventor: Joseph P. Spinelli, 277 Bronx River Rd., Yonkers, NY (US) 10704-3741

( * ) Notice: Subject to any disclaimer, the term of this patent is extended or adjusted under 35 U.S.C. 154(b) by 0 days.

(21) Appl. No.: 09/899,968

(22) Filed: Jul. 6, 2001

(51) Int. Cl.[7] ................................................ B60R 21/11
(52) U.S. Cl. ...................... 280/748; 280/749; 280/752
(58) Field of Search ................................ 280/748, 749, 280/751, 752; 296/214, 146.5

(56) References Cited

U.S. PATENT DOCUMENTS

| | | | |
|---|---|---|---|
| 3,623,565 A | | 11/1971 | Ward |
| 3,643,972 A | * | 2/1972 | Caiati et al. ................ 280/749 |
| 4,561,514 A | | 12/1985 | Yamada |
| 4,860,496 A | | 8/1989 | Hellriegel |
| 4,919,467 A | * | 4/1990 | Guimelli .................... 296/24.1 |
| 4,964,667 A | * | 10/1990 | Reis et al. .................. 296/136 |
| 5,141,273 A | | 8/1992 | Freeman |
| 5,328,230 A | * | 7/1994 | Curchod ...................... 296/136 |
| 5,460,409 A | * | 10/1995 | Conner ........................ 160/327 |
| 5,511,842 A | * | 4/1996 | Dillon ......................... 224/400 |
| 5,669,999 A | | 9/1997 | Anderegg et al. |
| 5,700,050 A | * | 12/1997 | Gonas ........................ 264/46.6 |
| 5,704,644 A | | 1/1998 | Jaggi |
| 6,302,463 B1 | * | 10/2001 | Moore et al. ............... 296/24.1 |
| 6,412,852 B1 | * | 7/2002 | Koa et al. ................... 296/146.5 |

* cited by examiner

Primary Examiner—Paul N. Dickson
Assistant Examiner—Toan C To

(57) ABSTRACT

A vehicular impact resistant barrier system for mounting in an interior passenger compartment a vehicle. The interior passenger compartment of the vehicle is defined by a plurality of doors, a firewall, a floor wall, a roof wall, and a rear wall. The vehicular impact resistant barrier system includes a plurality of protective sheets that are mountable in the interior passenger compartment of the vehicle. Each of the protective sheets comprises a plurality of woven fibers.

1 Claim, 3 Drawing Sheets

VEHICULAR IMPACT RESISTANT BARRIER SYSTEM

BACKGROUND OF THE INVENTION

1. Field of the Invention

The present invention relates to vehicle safety devices and more particularly pertains to a new vehicular impact resistant barrier system for mounting in an interior passenger compartment of a vehicle. The interior passenger compartment of the vehicle is defined by a plurality of doors, a firewall, a floor wall, a roof wall and a rear wall.

2. Description of the Prior Art

The use of vehicle safety devices is known in the prior art. More specifically, vehicle safety devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,141,273; U.S. Pat. No. 4,561,514; U.S. Pat. No. 4,860,496; U.S. Pat. No. 5,704,644; U.S. Pat. No. 5,669,999; and U.S. Pat. No. 3,623,565.

While these devices fulfill their respective, particular objectives and requirements, the aforementioned patents do not disclose a new vehicular impact resistant barrier system. The inventive device includes a plurality of protective sheets that are mountable to the interior passenger compartment of the vehicle. Each of the protective sheets comprises a plurality of woven fibers.

In these respects, the vehicular impact resistant barrier system according to the present invention substantially departs from the conventional concepts and designs of the prior art, and in so doing provides an apparatus primarily developed for the purpose of mounting in an interior passenger compartment of a vehicle. The interior passenger compartment of the vehicle is defined by a plurality of doors, a firewall, a floor wall, a roof wall and a rear wall.

SUMMARY OF THE INVENTION

In view of the foregoing disadvantages inherent in the known types of vehicle safety devices now present in the prior art, the present invention provides a new vehicular impact resistant barrier system construction wherein the same can be utilized for mounting in an interior passenger compartment of a vehicle. The interior passenger compartment of the vehicle is defined by a plurality of doors, a firewall, a floor wall, a roof wall, and a rear wall.

The general purpose of the present invention, which will be described subsequently in greater detail, is to provide a new vehicular impact resistant barrier system apparatus and method which has many of the advantages of the vehicle safety devices mentioned heretofore and many novel features that result in a new vehicular impact resistant barrier system which is not anticipated, rendered obvious, suggested, or even implied by any of the prior art vehicle safety devices, either alone or in any combination thereof.

To attain this, the present invention generally comprises a plurality of protective sheets that are mountable in the interior passenger compartment of the vehicle. Each of the protective sheets comprises a plurality of woven fibers.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular impact resistant barrier system apparatus and method which has many of the advantages of the vehicle safety devices mentioned heretofore and many novel features that result in a new vehicular impact resistant barrier system which is not anticipated, rendered obvious, suggested, or even implied by any of the prior art vehicle safety devices, either alone or in any combination thereof.

It is another object of the present invention to provide a new vehicular impact resistant barrier system which may be easily and efficiently manufactured and marketed.

It is a further object of the present invention to provide a new vehicular impact resistant barrier system which is of a durable and reliable construction.

An even further object of the present invention is to provide a new vehicular impact resistant barrier system which is susceptible of a low cost of manufacture with regard to both materials and labor, and which accordingly is then susceptible of low prices of sale to the consuming public, thereby making such vehicular impact resistant barrier system economically available to the buying public.

Still yet another object of the present invention is to provide a new vehicular impact resistant barrier system which provides in the apparatuses and methods of the prior art some of the advantages thereof, while simultaneously overcoming some of the disadvantages normally associated therewith.

Still another object of the present invention is to provide a new vehicular impact resistant barrier system for mounting in an interior passenger compartment a vehicle. The interior passenger compartment of the vehicle is defined by a plurality of doors, a firewall, a floor wall, a roof wall, and a rear wall.

Yet another object of the present invention is to provide a new vehicular impact resistant barrier system which includes a plurality of protective sheets that are mountable in the interior passenger compartment of the vehicle. Each of the protective sheets comprises a plurality of woven fibers.

Still yet another object of the present invention is to provide a new vehicular impact resistant barrier system that protects users in the interior passenger compartment of the vehicle from injury caused by objects entering the interior passenger compartment during a collision.

Even still another object of the present invention is to provide a new vehicular impact resistant barrier system that, unlike the prior art which is heavy, is light weight providing added protection without increasing the expense of operating the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
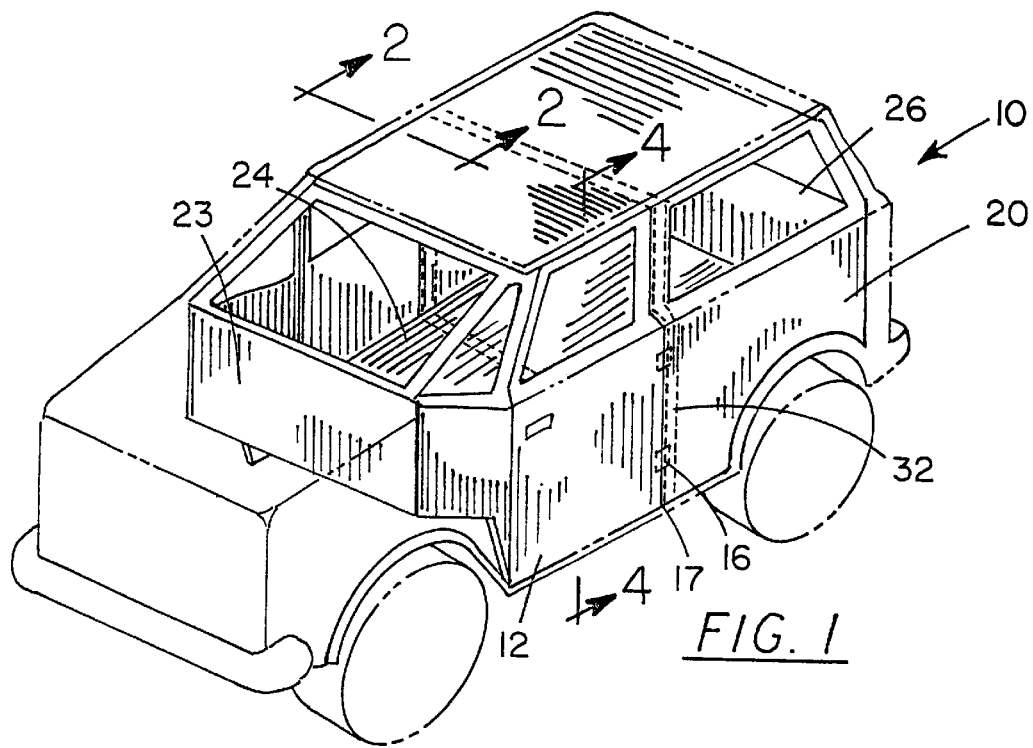
FIG. 1 is a schematic perspective view of a new vehicular impact resistant barrier system according to the present invention.
Figure 2:
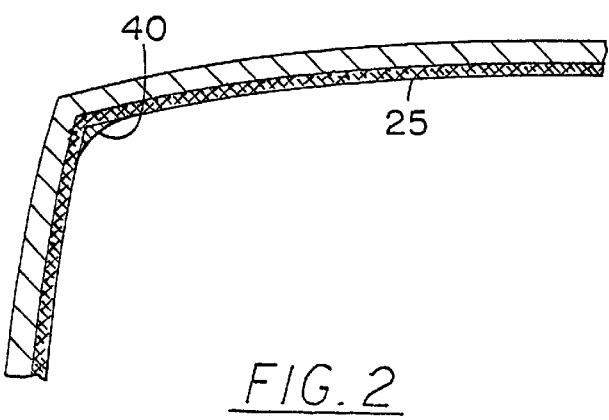
FIG. 2 is a schematic cross-sectional view of the present invention taken along line 2—2 of FIG. 1.
Figure 3:
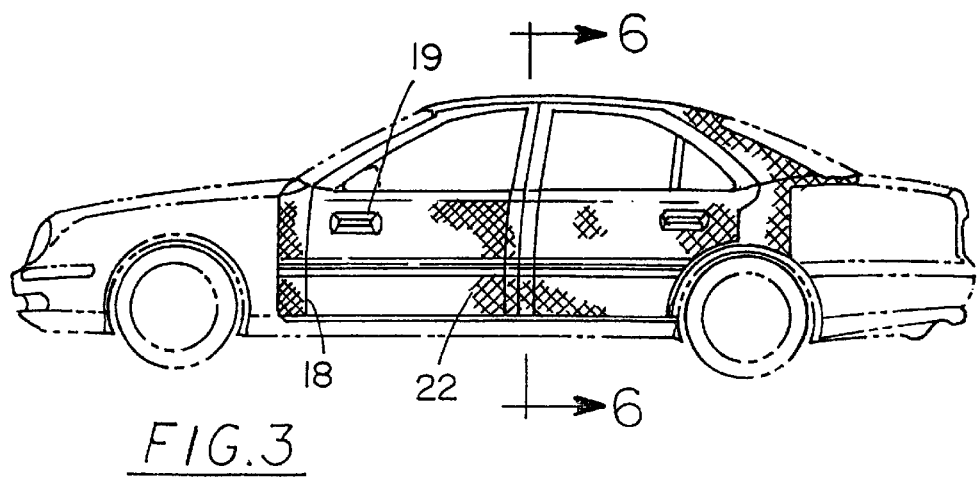
FIG. 3 is a schematic side view of the present invention.
Figure 4:
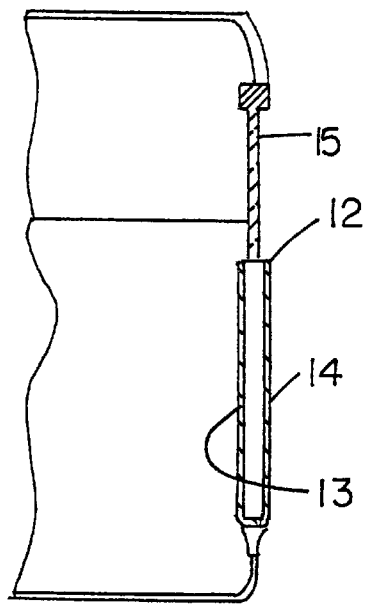
FIG. 4 is a schematic cross-sectional view of the present invention taken along line 4—4 of FIG. 1.
Figure 5:
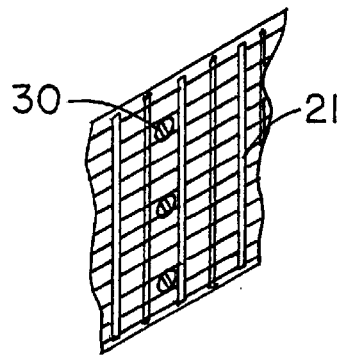
FIG. 5 is a schematic frontal view of the present invention.

With reference now to the drawings, and in particular to FIGS. 1 through 6 thereof, a new vehicular impact resistant barrier system embodying the principles and concepts of the present invention and generally designated by the reference numeral 10 will be described.

As best illustrated in FIGS. 1 through 6, the vehicular impact resistant barrier system 10 generally comprises a plurality of protective sheets 20 that are mountable in the interior passenger compartment of the vehicle and a support member 32 for preventing the roof of the vehicle from collapsing on the users of the vehicle traveling in the interior passenger compartment of the vehicle. Each of the protective sheets 20 may be mounted in the interior compartment of the vehicle by an adhesive or fusing processes.

The impact resistant barrier system 10 may include a pair of doors 12 for providing access to the interior passenger compartment of the vehicle. Each of the doors 12 is pivotally mountable to a portion of the vehicle. Each of the doors 12 may include an inner wall 13 spaced a distance from an outer wall 14. The pair of doors 12 may comprise a substantially rigid material such as, for example, a metal or fiberglass material.

A glass member 15 may be provided that is retractably mounted in the space between the inner 13 and outer 14 walls of each of the doors 12. The glass member 15 may comprise a glass or plastic material.

A hinging means 16 may be provided for pivotally coupling each of the doors 12 to the vehicle. The hinging means 16 extends between and is couplable to a portion of each of the doors 12 and a portion of the vehicle such that an end 18 of each of the doors 12 opposite the hinging means 16 pivots away from a front end of the vehicle.

A pair of handles 19 may be provided for selectively opening each of the doors 12. Each of the handles 19 may be mounted on the outer wall 14 of each of the doors 12. Each of the handles 19 may be positioned generally adjacent to the end 18 of each of the doors 12.

Each of the plurality of protective sheets 20 preferably comprises a plurality of woven fibers 21. The woven fibers 21 may comprise a lightweight metal material that makes each of the protective sheets 20 pliable. Each of the sheets 20 may be woven in a variety of patterns to maximize resistance to puncturing by an object entering the interior passenger compartment of the vehicle.

The plurality of protective sheets 20 may include a plurality of door sheets 22 that are mountable to an inner surface of each of the doors of the vehicle. Each of the door sheets 22 may be positioned between a door trim of the vehicle and the doors in order to maintain the attractive appearance of the interior passenger compartment of the vehicle.

The plurality of protective sheets 20 may also include firewall sheet 23 that is mountable to an inner surface of the firewall of the vehicle. The firewall sheet 23 may be positioned between a dashboard of the vehicle and the firewall. The firewall sheet 23 protects users of the vehicle from objects and the engine of the vehicle entering the interior passenger compartment of the vehicle through the firewall.

The plurality of protective sheets 20 may additionally include a floor wall sheet 24 that may be mountable to an inner surface of the floor of the vehicle. The floor wall sheet 24 may be positioned between a carpet of the vehicle and the floor wall to protect users of the vehicle from objects entering the interior passenger compartment of the vehicle through the floor wall.

The plurality of protective sheets 20 may include a roof wall sheet 25 that may be mountable to an inner surface of the roof wall of the vehicle. The roof wall sheet 25 may be positioned between a roof cloth of the vehicle and the roof wall to protect users of the vehicle from objects entering the interior passenger compartment of the vehicle through the roof wall.

The plurality of protective sheets 20 may also include a rear wall sheet 26 that may be mountable to an inner surface of the rear wall of the vehicle. The rear wall sheet 26 may be positioned between a rear seat of the vehicle and the rear wall to protect users of the vehicle from objects entering the interior passenger compartment of the vehicle through the rear wall.

A fastening means 30 may be provided for fastening the plurality of sheets 20 to the interior passenger compartment of the vehicle. The fastening means may extend between and may be coupled to the interior passenger compartment of the vehicle. The fastening means 30 may comprise an adhesive.

In an alternate embodiment of the present invention, the fastening means 30 may extend through the plurality of sheets 20 and be removably fastenable to the interior passenger compartment of the vehicle. In the alternate embodiment of the present invention, the fastening means 30 may comprise a screw, however, other types of fastening means may be employed.

Figure 6:
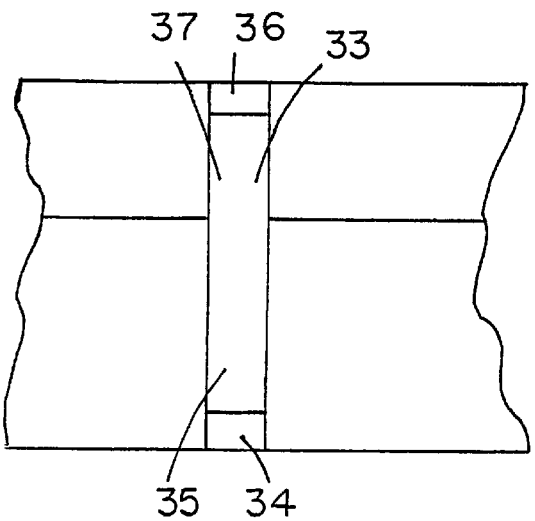
FIG. 6 is a schematic cross-sectional view of the present invention taken along line 6—6 of FIG. 3.

As illustrated in FIG. 6, the support member 32 may be generally rectangular such that the support member 32 includes a generally rectangular cross section taken substantially perpendicular to a longitudinal axis of the support member 32.

The support member 32 may include a pair of door portions 33 that may be mountable to a surface of the vehicle between a pair of the doors of the vehicle or if the vehicle has only a single pair of doors then the pair of door portions 33 may be positioned between the doors and a rear of the vehicle. Each of the door portions 33 preferably extends between the floor wall and the roof wall of the vehicle.

The support member 32 may include a floor portion 34 that may be mountable to the floor wall of the vehicle. The floor portion 34 may extend between and be coupled to a lower end 35 of each of the pair of door portions 33.

The support member 32 may include a roof portion 36 that may be mountable to the roof wall of the vehicle. The roof portion 36 may extend between be coupled to an upper end 37 of each of the pair of door portions 32. The support member 32 preferably comprises a substantially rigid material such as, for example, an aluminum material. The support member 32 may comprise of a hollow or solid material to support the roof wall of the vehicle.

A brace means 40 may be provided for bracing the support member 32. The brace means 40 may extend between and be coupled to the door portions 33 and the floor 34 and roof 36 portions of the support member 32. The brace means 40 may be positioned generally adjacent to a juncture of the door: portions 32 and the floor 36 and roof 36 portions of the support member 32.

In use, the plurality of protective sheets 20 may be mounted to the interior passenger compartment of a new vehicle as it is being manufactured. The plurality of protective sheets 20 may also be mountable to vehicle as an aftermarket item providing security to users traveling in the interior passenger compartment of the vehicle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:
1. A vehicular impact resistant barrier system comprising:
a vehicle having an interior passenger compartment, the vehicle including a plurality of doors, a firewall, a floor wall, and a roof wall, and a rear wall to define the interior passenger compartment, the pair of doors providing access to the interior passenger compartment of the vehicle and being pivotally movable, each of said doors being formed of a substantially rigid material and each of said doors comprising:
an inner wall spaced a distance from an outer wall;
a glass member being retractably mounted in the space between said inner and outer walls;
a hinging means for pivotally coupling said door to the vehicle, said hinging means extending between and couplable to a portion of said door and a portion of the vehicle such that an end of said door pivots away from a front end of the vehicle;
handle for selectively opening said door, said handle being mounted on said outer wall of said door, said handle being positioned generally adjacent to said end of said door;
a plurality of protective sheets mounted to the interior passenger compartment of the vehicle and allow the user to safely operate the vehicle, each of said protective sheets comprising a plurality of woven fibers, each of said sheets being positioned between the body of the vehicle and any passengers in the passenger compartment such that said sheets are for inhibiting inward movement of the body of the vehicle with respect to the passenger compartment and injuring the passengers, said plurality of protective sheets including:
a plurality of door sheets mounted to an interior passenger compartment surface of each of the doors of the vehicle, each of said door sheets being positioned between a door trim of the vehicle and the doors;
a firewall sheet mounted to an interior passenger compartment surface of the firewall, said firewall sheet being mounted between a dashboard of the vehicle and the firewall;
a floor wall sheet mounted to an inner surface of the floor of the vehicle, said floor wall sheet being positioned between a carpet of the vehicle and the floor wall;
a roof wall sheet mounted to an inner surface of the roof wall of the vehicle, said roof wall sheet being positioned between a roof cloth of the vehicle and the roof wall;
a rear wall sheet mounted to an inner surface of the rear wall of the vehicle, said rear wall sheet being positioned between a rear seat of the vehicle and the rear wall;
wherein said woven fibers comprises a metal material;
a fastening means for fastening said plurality of sheets to the interior passenger compartment of the vehicle, said fastening means extending between and being coupled to said plurality of sheets and the interior passenger compartment of the vehicle;
said fastening means extending through said plurality of sheets and being removably fastenable to the interior passenger compartment of the vehicle;
a support member being coupled to a portion of said sheets such that said support member extends around the passenger compartment of the vehicle for preventing the roof of the vehicle from collapsing during an accident, said support member being mounted to the interior passenger compartment of the vehicle;

said support member being generally rectangular such that said support member has a generally rectangular cross section taken substantially perpendicular to a longitudinal axis of said support member;

said support member including:
- a pair of door portions mounted to a surface of the vehicle between a pair of the doors of the vehicle, each of said door portions extending between the floor wall and the roof wall;
- a floor portion mounted to the floor wall of the vehicle, said floor portion extending between and coupled to a lower end of each of said pair of door portions;
- a roof portion mounted to the roof wall of the vehicle, said roof portion extending between an upper end of each of said pair of door portions;

said support member comprising a substantially rigid material; and a brace means for bracing said support member, said brace means extending between and coupled to said door portions and said floor and roof portions, said brace means being positioned generally adjacent to a juncture of said door portions and said floor and roof portions of said support member.

* * * * *